United States Patent Office 2,932,671
Patented Apr. 12, 1960

2,932,671

PROCESS FOR PRODUCING CONDENSATION PRODUCTS OF ALKYLATED PHENOLS WITH ALDEHYDES

Onslow B. Hager, Glenside, Pa., and Bernard Coe, Palmyra, N.J., assignors to Alco Oil & Chemical Corporation, Philadelphia, Pa., a corporation of Ohio No Drawing. Application December 13, 1957
Serial No. 702,508

10 Claims. (Cl. 260—619)

This invention relates to the condensation of phenols with aldehydes, and more particularly to an improved method for condensing dialkyl phenols with aldehydes to produce condensates of greater purity in high yield which are particularly suitable as antidegradants or stabilizers for incorporation into rubbery compositions prior to vulcanization.

As is well known, vulcanized rubber products, made of both natural and synthetic rubbers, quickly develop altered properties after exposure to atmospheric conditions. The rate of deterioration is dependent upon such factors as the composition of the atmosphere to which they are exposed, the temperature, pressure, the presence or absence of sunlight, and the like. It, therefore, has been necessary to include in the rubber compositions prior to vulcanization compounds which render the compositions resistant to deterioration by the action of oxygen, ozone, oxides of nitrogen and other constituents of the atmosphere under certain conditions of temperature, pressure, sunlight and the like.

Compounds which have proven to be particularly suitable as antidegradants for rubber compositions are condensation products of certain 2-alkyl-5-methylphenols with lower aliphatic aldehydes, which products, when in substantially pure form, are white, crystalline solids. These condensation products have generally been prepared by reacting an aliphatic aldehyde with a 2-alkyl-5-methylphenol in the presence of an acid or alkali condensation catalyst. Reactions of this type, however, generally produce low yields of a condensation product which is contaminated with unreacted reactants and side reaction products which highly color the condensation product and make it unsuitable for use as an antidegradant where a discolored rubber product cannot be tolerated. Apparently these contaminating, coloring substances display a solvent activity for the condensation product making direct recovery of a white, crystalline product virtually impossible.

When the rubber composition is a latex, the antidegradant is generally added to the latex in the form of an aqueous dispersion containing on the order of 50 percent solids. Unfortunately, condensation products produced according to the prior condensation processes, besides being highly colored, cannot be readily dispersed in aqueous medium to form such dispersions or suspensions even with the aid of wetting and dispersing agents.

In an effort to obtain the condensates in purer form, resort has been made to various costly purification methods. One such purification procedure involves chilling the oily mixture containing the condensation product, side reaction products and unreacted reactants to cause crystallization of the condensate. The crystallized product thus obtained is recrystallized from a low boiling organic solvent such as heptane. Other purification techniques involve vacuum distillation, a particularly expensive operation in large-scale commercial manufacture.

A primary object of this invention is to provide an improved method for condensing dialkylphenols with aldehydes to produce higher yields of condensates of greater purity.

Another object of this invention is the provision of an improved process for directly producing condensates of dialkylphenols with aldehydes in the form of substantially white crystals of high purity without resort to costly purification procedures.

Still another object of this invention is to provide a relatively simple and inexpensive process for producing condensates of dialkylphenols with aldehydes which may be readily dispersed in aqueous medium to form dispersions of relatively high solids content.

A further object of this invention is the provision of an improved, yet inexpensive, method for condensing dialkylphenols with aldehydes which obviates the difficulties of the prior known processes.

These and other objects of this invention will become more clearly apparent from a consideration of this specification and appended claims.

According to this invention there is provided a process for producing a condensation product of an alkylated phenol with an aldehyde, which comprises condensing at a reaction temperature of from about 20° to about 65° C. a dialkylphenol of the general structural formula:

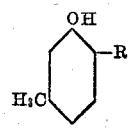

in which R is an alkyl group containing from 3 to 10 carbon atoms with an aliphatic aldehyde containing from 1 to 6 carbon atoms, the molar ratio of alkylated phenol to aldehyde being from about 1.5:1 to 2:1, in the presence of glacial acetic acid, an acid condensation catalyst, and from about 1 to about 10 percent, by weight, based on alkylated phenol, of an anionic surface active agent.

In accordance with a preferred process according to this invention, 2-tertiarybutyl-5-methylphenol is condensed with formaldehyde, acetaldehyde or an aldehyde polymer which liberates these substances under the reaction conditions, in the presence of an anionic surface active agent comprising a sodium salt of an alkyl benzene sulfonic acid containing an average of 16 carbon atoms at a reaction temperature in the range between about 40° and 50° C. After the reaction mixture attains a paste-like consistency, a small amount of a liquid hydrocarbon solvent boiling in the range between about 150° and 250° C. is added to the reaction mixture and condensation is further promoted by maintaining the reaction temperature within the above stated range of reaction temperatures. Thereafter, water is added to the reaction mixture, and the white, crystalline condensation product is separated therefrom, as for example by filtration.

It was found that according to the method of this invention, particularly according to the preferred form thereof described in the preceeding paragraph, very high yields of the order of 85 percent or greater of a condensation product of a dialkylphenol with a lower aliphatic aldehyde, in the form of substantially white crystals of very high purity, e.g., 95 percent or higher, can be obtained. The presence of an anionic surface active agent apparently produces several very desirable results, which results are not obtainable with surface active agents generally. Because of the hydrotropic property of solubilizing organic materials displayed by anionic surface active agents, they permit intimate contact between chemicals thereby promoting the condensation reaction to produce high yields of a white crystalline product. Furthermore, because of the intimate contact so obtained between reactants, lower reaction temperatures, which favor the production of the desired condensates and minimize the formation of contaminating side reaction products, may be employed. A further benefit from the employment of anionic surface active agents in the condensation resides in the fact that after completion of the condensation reaction, the reaction mixture may be readily diluted with water to form a stable emulsion from which a white crystalline condensation product may be separated by simple and inexpensive procedures, as for example by filtration.

A particular advantage of the process of this invention is that the white, crystalline product of high purity directly obtained thereby may be employed as an antidegradant in rubber compositions without fear of discoloration of the compositions due to the antidegradant. Further, the highly pure white crystals may be readily dispersed in aqueous medium, generally with the aid of dispersing agents, to form aqueous suspensions or dispersions. A preferred method of dispersing the products produced by the method of this invention to form aqueous dispersions of high solids content is disclosed in our copending application Serial No. 702,507, filed December 13, 1957.

The dialkylphenols which may be employed in the process of this invention are mono-alkyl m-cresols of the general structural formula:

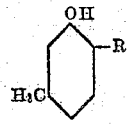

in which R is an alkyl group containing from 3 to 10 carbon atoms. In these 2-alkyl-5-methylphenols, the alkyl radical may be propyl, isopropyl, n-butyl, isobutyl, tertiarybutyl, the various isomeric amyl radicals, the various isomeric hexyl radicals, the various isomeric heptyl radicals, the various isomeric octyl radicals, the various isomeric nonyl radicals and the various isomeric decyl radicals. In lieu of the alkyl radicals enumerated, substituted alkyl radicals, such as cyclohexyl, benzyl, alpha-methylbenzyl; alpha, alpha-dimethylbenzyl; various nuclearly alkylated benzyl radicals, and homologs of the cyclohexyl radical are within the scope of this invention. A preferred dialkylphenol is 2-tertiarybutyl-5-methylphenol.

The aldehydes which are used in preparing the antidegradant condensates according to the process of this invention are low molecular weight aldehydes containing from 1 to 6 carbon atoms, such as formaldehyde, acetaldehyde, crotonaldehyde, butyraldehyde, 2-ethylbutyraldehyde, and polymeric aldehydes such as paraldehyde, paraformaldehyde, and the like, which liberate the aforementioned aldehydes under reaction conditions. Preferred aldehydes comprise formaldehyde, acetaldehyde, and paraldehyde.

Generally, the molar ratio of dialkylphenol to aldehyde employed in the process should be within the range between about 1.5:1 and about 2:1. The use of any substantial excess of aldehyde over these proportions should be avoided in order to produce the desired condensates and to avoid production of high molecular weight condensates which tend to contaminate and discolor the desired condensates.

In carrying out the reaction, the reactants are dissolved and mixed together in glacial acetic acid, which acts not only as a common solvent for the reactants, but advantageously imbibes water formed during the course of the condensation reaction. Sufficient glacial acetic acid should be employed to completely dissolve the reactants. Generally, from about 30 to about 50 percent, by weight, based on dialkylphenol, of glacial acetic acid may be employed.

Various acid condensation catalysts may be used, such as sulfuric acid, phosphoric acid, anhydrous aluminum chloride, boron trifluoride, boron fluoride complexes, ferric chloride, anhydrous zinc chloride, hydrogen chloride, and activated clays such as acid treated fuller's earth, bentonite, floridin, and the like. A preferred catalyst is sulfuric acid, which does not require the use of expensive corrosion-resistant equipment which must be employed with highly corrosive mineral acids such as hydrochloric acid. The amount of acid condensation catalyst required may be as low as about 0.5 percent, by weight, based on alkylated phenol. However, larger amounts, as high as 10 percent, by weight, may also be employed.

The condensation reaction is carried out at a temperature in the range between about 20° and about 65° C., and preferably between about 40° and 50° C. As stated previously, these relatively low reaction temperatures are believed to be possible by reason of the use of anionic surface active agents which cause more intimate contact between reactants. A particular advantage in the use of such low temperatures is that the formation of the desired condensates is favored, and the tendency toward the formation of unwanted higher molecular weight side reaction products is greatly reduced.

As stated previously, the condensation process of this invention is carried out in the presence of an anionic surface active agent. Typical of such anionic surface active agents are alkyl sulfonates, alkyl aryl sulfonates, amides of sulfosuccinic acid, alkyl esters of sulfosuccinic acid, alkylphenoxypolyethoxyethyl sulfates, fatty alcohol, sulfates, and the like. Preferred anionic surface active agents are those selected from the group consisting of alkyl aryl sulfonates in which the alkaryl group contains from 12 to 20 carbon atoms, fatty alcohol sulfates of the general structural formula:

$$CH_3(CH_2)_nOSO_3X$$

in which $n$ is an integer from 7 to 17 and X is hydrogen, sodium and potassium, alkylphenoxypolyethoxyethyl sulfates of the general structural formula:

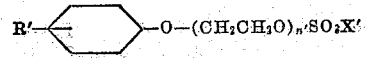

in which R' is an alkyl group containing from 8 to 10 carbon atoms, $n'$ is an integer from 2 to 5 and X' is hydrogen, sodium and potassium, and mixtures of these anionic surface active agents.

Alkyl aryl sulfonates which may be used are those derived from benzene, naphthalene, diphenyl and diphenylmethane, and include among others: sodium and potassium hexyl-, heptyl-, octyl-, nonyl-, decyl-, hendecyl-, dodecyl-, tridecyl-, and tetradecylbenzene sulfonate. The alkyl group may comprise either a straight or branched chain. A preferred alkyl aryl sulfonate comprises the sodium salt of an alkyl benzene sulfonate containing an average of 16 carbon atoms.

Suitable alkylphenoxypolyethoxyethyl sulfates include sodium and potassium octyl-, nonyl-, and decylphenyl-, di-, tri-, tetra-, and pentaethyleneglycol sulfate, and the like. The alkyl group of these compounds may comprise either a straight or branched chain. A preferred material is sodium ditertiarybutylphenyldiethyleneglycol sulfate.

Among the anionic surface active agents which have been found to be particularly useful in the process of this invention are the fatty alcohol sulfates, typical of which are sodium and potassium octyl-, nonyl-, decyl-, hendecyl-, dodecyl-, tridecyl-, tetradecyl-, pentadecyl-, hexadecyl-, heptadecyl- and octadecylsulfate. Sodium lauryl sulfate is a preferred fatty alcohol sulfate for the purposes of this invention.

Generally, from about 1 to about 10 percent, and preferably from about 2 to about 5 percent, by weight, based on alkylated phenol, of anionic surface active agent may be used.

At the completion of the condensation reaction, which requires generally a period of time on the order of from about 1 to 6 hours, the reaction mixture may be diluted with water. Due to presence of the anionic surface active agent, upon addition of water to the reaction mixture, a stable emulsion is formed in which the crystals of condensate are dispersed. The white crystalline condensation product can readily be separated from this emulsion, as for example by filtration. The product so separated has a very high degree of purity of the order of 95 percent or greater. Sufficient water should be added to form an emulsion in which the aqueous phase is the continuous phase and oily unreacted reactants and/or side reaction products are the disperse phase.

Further purification of the solid product can readily be effected by merely subjecting the product to one or more washing operations with water. Preferably, at least one washing is made with a dilute aqueous solution of an anionic surface active agent, such as for example the type employed during the condensation reaction.

During the condensation reaction, the reaction mixture may thicken and often will attain a paste-like consistency. In order to thin the mixture and insure thorough mixing of the reactants, which preferably is accomplished by gentle agitation of the mixture, as for example by slowly stirring the mixture, it may be desirable to introduce to the reaction mixture a small quantity of a hydrocarbon solvent which is liquid at reaction temperatures. A preferred solvent is of the type generally referred to as a "safety solvent" boiling in the range between about 150° and 250° C. Suitable solvents for the purposes of this invention include aliphatic and aromatic hydrocarbons and mixtures of these hydrocarbons. Petroleum fractions which are suitable as solvents comprise kerosene, coal oil, lubricating oils, and the like. Other hydrocarbon solvents include lower molecular weight aromatic hydrocarbons such as benzene and alkylated benzenes, for example toluene and xylenes, and lower molecular weight aliphatic and alicyclic hydrocarbons such as hexane, cyclohexane, and the like. The quantity of liquid petroleum fraction required for this purpose does not ordinarily exceed about 20 percent, by weight, based on alkylated phenol. Generally from about 10 to 20 percent, and preferably from about 15 to 17 percent, of hydrocarbon solvent may be employed.

*Example I*

328 grams of 2-tert-butyl-5-methylphenol and 60.1 grams of paraldehyde are mixed together in the presence of 33.3 grams of a 30 percent aqueous solution of a sodium salt of an alkyl benzene sulfonic acid containing an average of 16 carbon atoms to form a uniformly turbid mixture. 132 grams of glacial acetic acid is blended into the mixture, the mixture is heated to a temperature of from about 40° to 45° C., and 16.6 grams of 50 percent sulfuric acid is added. The mixture is slowly stirred for a period of about one hour at the end of which time the mixture develops a thick paste-like consistency. 55.7 grams of a liquid petroleum fraction having a boiling range of from about 191° to 240° C. and containing 24 percent aromatics, 35 percent naphthenes and 41 percent paraffins is added to thin the mixture and permit sufficient agitation thereof to prevent the sulfuric acid catalyst from settling as a separate layer in the bottom of the reactor. The reaction mixture is maintained at a reaction temperature of about 40° to 45° C. for an additional period of about 4 hours to promote further condensation. Thereafter, 837 grams of water is slowly blended into the mixture with agitation to form an emulsion, and the emulsion is filtered. A white filter cake representing a yield of condensate of 85 percent is obtained. While the cake remains on the filter it is washed with water. The washed filter cake after drying has a purity of about 98 percent and melts at 199° C.

*Example II*

The method of Example I may be repeated employing 2-n-octyl-5-methylphenol in place of 2-tert-butyl-5-methylphenol.

*Example III*

The method of Example I may be repeated employing 2-n-propyl-5-methylphenol in place of 2-tert-butyl-5-methylphenol.

*Example IV*

The method of Example I may be repeated employing sodium hexylbenzene sulfonate in place of an alkyl benzene sulfonate containing an average of 16 carbon atoms.

*Example V*

328 grams of 2-tert-butyl-5-methylphenol and 60.1 grams of paraldehyde are mixed together in the presence of 42 grams of a 28 percent aqueous solution of sodium ditertiarybutylphenyldiethyleneglycol sulfate to form a uniformly turbid mixture. 132 grams of glacial acetic acid is blended into the mixture, the mixture is heated to a temperature of from about 40° to 45° C., and 16.6 grams of 50 percent sulfuric acid is added. The mixture is slowly stirred for a period of about one hour at the end of which time the mixture develops a thick paste-like consistency. 55.7 grams of a liquid petroleum fraction having a boiling range of from about 191° to 240° C. and containing 24 percent aromatics, 35 percent naphthenes and 41 percent paraffins is added to thin the mixture and permit sufficient agitation thereof to prevent the sulfuric acid catalyst from settling as a separate layer in the bottom of the reactor. The reaction mixture is maintained at a reaction temperature of about 40° to 45° C. for an additional period of about 4 hours to promote further condensation. Thereafter, 837 grams of water is slowly blended into the mixture with agitation to form an emulsion, and the emulsion is filtered. A white filter cake representing a yield of condensate of 89 percent is obtained. While the cake remains on the filter it is washed with water. The washed filter cake after drying has a purity of about 98 percent and melts at 199° C.

*Example VI*

The method of Example V may be repeated employing sodium ditertiarybutylphenylpentaethyleneglycol sulfate in place of sodium ditertiarybutylphenyldiethyleneglycol sulfate.

*Example VII*

The method of Example V may be repeated employing sodium decylphenyltriethyleneglycol sulfate in place of ditertiarybutylphenyldiethyleneglycol sulfate.

*Example VIII*

328 grams of 2-tert-butyl-5-methylphenol and 60.1 grams of paraldehyde are mixed together in the presence of 10.8 grams of sodium lauryl sulfate to form a uniformly turbid mixture. 132 grams of glacial acetic acid is blended into the mixture, the mixture is heated to a temperature of from about 40° to 45° C., and 16.6 grams of 50 percent sulfuric acid is added. The mixture is slowly stirred for a period of about one hour at the end of which time the mixture develops a thick paste-like consistency. 55.7 grams of a liquid petroleum fraction having a boiling range of from about 191° to 240° C. and containing 24 percent aromatics, 35 percent naphthenes and 41 percent paraffins is added to the thin mixture and permit sufficient agitation thereof to prevent the sulfuric acid catalyst from settling as a separate layer in the bottom of the reactor. The reaction mixture is maintained at a reaction temperature of about 40° to 45° C. for an additional period of about 4 hours to promote further condensation. Thereafter, 837 grams of water is slowly blended into the mixture with agitation to form an emulsion, and the emulsion is filtered. A white filter cake representing a yield of condensate of 74 percent is obtained. While the cake remains on the filter it is washed with water. The washed filter cake after drying has a purity of about 98 percent and melts at 199° C.

*Example IX*

The method of Example VIII may be repeated employing sodium octylsulfate in place of sodium laurylsulfate.

*Example X*

The method of Example VIII may be repeated employing sodium octadecylsulfate in place of sodium laurylsulfate.

*Example XI*

328 grams of 2-tert-butyl-5-methylphenol and 60.1 grams of paraldehyde are mixed together in the presence of a mixture of 18 grams of a 30 percent aqueous solution of a sodium salt of an alkyl benzene sulfonic acid containing an average of 16 carbon atoms and 5.5 grams of sodium lauryl sulfate to form a uniformly turbid mixture. 132 grams of glacial acetic acid is blended into the mixture, the mixture is heated to a temperature of from about 40° to 45° C., and 16.6 grams of 50 percent sulfuric acid is added. The mixture is slowly stirred for a period of about one hour at the end of which time the mixture develops a thick paste-like consistency. 55.7 grams of a liquid petroleum fraction having a boiling range of from about 191° to 240° C. and containing 24 percent aromatics, 35 percent naphthenes and 41 percent paraffins is added to thin the mixture and permit sufficient agitation thereof to prevent the sulfuric acid catalyst from settling as a separate layer in the bottom of the reactor. The reaction mixture is maintained at a reaction temperature of about 40° to 45° C. for an additional period of about 4 hours to promote further condensation. Thereafter, 837 grams of water is slowly blended into the mixture with agitation to form an emulsion, and the emulsion is filtered. A white filter cake representing a yield of condensate of 85 percent is obtained. While the cake remains on the filter it is washed with water. The washed filter cake after drying has a purity of about 98 percent and melts at 199° C.

It is claimed:

1. The process for producing a condensation product of an alkylated phenol with an aldehyde, which comprises mixing together 2-tertiarybutyl-5-methylphenol and an aldehyde selected from the group consisting of formaldehyde, paraformaldehyde, acetaldehyde and paraldehyde, the molar ratio of alkylated phenol to aldehyde being from about 1.5:1 to about 2:1, in the presence of an amount of glacial acetic acid at least sufficient to completely dissolve said dialkylphenol and said aldehyde, an acid condensation catalyst and about 3%, by weight, based on alkylated phenol, of an anionic surface active agent selected from the group consisting of an alkyl aryl sulfonate in which the alkaryl group contains from 12 to 20 carbon atoms, an alkylphenoxyethoxyethyl sulfate of the formula:

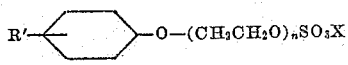

in which R' is an alkyl group containing from 8 to 10 carbon atoms, $n$ is an integer from 2 to 5 and X is selected from the group consisting of hydrogen, sodium and potassium; and a fatty alcohol sulfate of the formula:

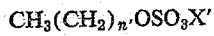

in which $n'$ is an integer from 7 to 17 and X' is selected from the group consisting of hydrogen, sodium and potassium, heating the resulting reaction mixture to a temperature of from about 20° to about 65° C. to promote condensation of said alkylated phenol with said aldehyde, introducing to said reaction mixture when it obtains a substantially paste-like consistency from about 10 to about 20%, by weight, based on alkylated phenol, of a hydrocarbon solvent, maintaining said reaction temperature to promote further condensation of alkylated phenol with aldehyde, adding water to said mixture, and separating the white crystalline condensation product from said reaction mixture.

2. The process according to claim 1 in which said reaction temperature is from about 40° to about 50° C.

3. The process according to claim 1 in which said acid condensation catalyst is sulfuric acid.

4. The process according to claim 1 in which said aldehyde is paraldehyde.

5. The process according to claim 1 in which said hydrocarbon is a liquid petroleum fraction boiling in the range between about 150° and 250° C.

6. The process for producing a condensation product of an alkylated phenol with an aldehyde, which comprises mixing 2-tertiarybutyl-5-methylphenol and an aldehyde selected from the group consisting of formaldehyde, paraformaldehyde, acetaldehyde and paraldehyde, the molar ratio of alkylated phenol to aldehyde being from about 1.5:1 to 2:1, in the presence of an amount of glacial acetic acid at least sufficient to completely dissolve said dialkylphenol, a sulfuric acid condensation catalyst and about 3 percent, by weight, based on alkylated phenol, of an anionic surface active agent selected from the group consisting of an alkyl aryl sulfonate in which the alkaryl group contains from 12 to 20 carbon atoms, an alkylphenoxyethoxyethyl sulfate of the formula:

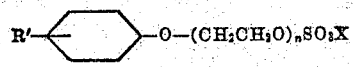

in which R' is an alkyl group containing from 8 to 10 carbon atoms, $n$ is an integer from 2 to 5 and X is selected from the group consisting of hydrogen, sodium and potassium, a fatty alcohol sulfate of the formula:

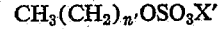

in which $n'$ is an integer from 7 to 17 and X' is selected from the group consisting of hydrogen, sodium and potassium, and mixtures thereof, heating the resulting reaction mixture to a reaction temperature of from about 40° to about 50° C. to promote condensation of said alkylated phenol with said aldehyde, introducing to said reaction mixture when it attains a substantially paste-like consistency from about 15 to about 17 percent, by weight, based on alkylated phenol, of a liquid petroleum fraction boiling in the range between about 150° and 250° C., maintaining said reaction temperature to promote further condensation of alkylated phenol with aldehyde, adding water to said mixture to form an emulsion in which the aqueous phase is the continuous phase, and separating the white, crystalline condensation product from said emulsion.

7. The process according to claim 6 in which said aldehyde is paraldehyde, and said anionic surface active agent is a sodium salt of an alkyl benzene sulfonic acid containing an average of about 16 carbon atoms.

8. The process according to claim 6 in which said aldehyde is paraldehyde, and said anionic surface active agent is sodium laurylsulfate.

9. The process according to claim 6 in which said aldehyde is paraldehyde, and said anionic surface active agent is sodium ditertiarybutylphenyldiethyleneglycol sulfate.

10. The process for producing a condensation product of an alkylated phenol with an aldehyde, which comprises mixing together 2-tertiarybutyl-5-methylphenol and an aldehyde selected from the group consisting of formaldehyde, paraformaldehyde, acetalydehyde and paraldehyde, the molar ratio of alkylated phenol to aldehyde being from about 1.5:1 to about 2:1, in the presence of an amount of glacial acetic acid at least sufficient to completely dissolve said dialkylphenol and said aldehyde, an acid condensation catalyst and about 3% of an alkyl aryl sulfonate in which the alkaryl group contains from 12 to 20 carbon atoms; heating the resulting reaction mixture to a temperature of from about 20° to about 65° C. to promote condensation of said alkylated phenol with said aldehyde, introducing to said reaction mixture when it obtains a substantially paste-like consistency from about 10 to about 20%, by weight, based on alkylated phenol, of a hydrocarbon solvent, maintaining said reaction temperature to promote further condensation of said alkylated phenol with said aldehyde, adding water to said mixture, and separating the white crystalline condensation product from said reaction mixture.

References Cited in the file of this patent

UNITED STATES PATENTS

| | | |
|---|---|---|
| 2,330,217 | Hunn | Sept. 28, 1943 |
| 2,499,361 | De Groote et al. | Mar. 7, 1950 |
| 2,538,355 | Davis et al. | Jan. 16, 1951 |
| 2,647,102 | Ambelang | July 28, 1953 |
| 2,822,404 | Ambelang | Feb. 4, 1958 |